United States Patent
Kanamaru et al.

(10) Patent No.: US 6,329,309 B1
(45) Date of Patent: *Dec. 11, 2001

(54) GLASS WITH HIGH SPECIFIC RIGIDITY FOR RECORDING MEDIUM

(75) Inventors: Moriyoshi Kanamaru; Tomoji Takahashi; Kazutaka Kunii; Takao Kawanaka, all of Kobe (JP)

(73) Assignee: Kabushiki Kaisha Kobe Seiko Sho (Kobe Steel, Ltd.), Kobe (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/395,186

(22) Filed: Sep. 14, 1999

(30) Foreign Application Priority Data

Sep. 30, 1998 (JP) .................................. 10-279038
Apr. 2, 1999 (JP) .................................. 11-096987

(51) Int. Cl.$^7$ .......................... C03C 3/083; C03C 3/085; C03C 3/11
(52) U.S. Cl. ................. 501/56; 501/64; 501/68; 501/72; 360/131; 360/135; 428/694 R
(58) Field of Search .................. 501/56, 64, 68, 501/69, 70, 72; 360/131, 135; 428/141, 694 R, 900

(56) References Cited

U.S. PATENT DOCUMENTS

| | | | | |
|---|---|---|---|---|
| 4,070,198 | * | 1/1978 | Chyung et al. | 501/56 |
| 4,097,295 | * | 6/1978 | Chyung et al. | 501/56 |
| 4,304,602 | * | 12/1981 | Wusirika | 501/56 |
| 4,608,352 | * | 8/1986 | Laurent et al. | 501/56 |
| 4,609,631 | * | 9/1986 | Messier et al. | 501/56 |
| 4,940,678 | * | 7/1990 | Aitken | 501/56 |
| 4,957,883 | * | 9/1990 | Kobayashi et al. | 501/56 |
| 5,166,102 | * | 11/1992 | Drouet et al. | 501/56 |
| 5,576,253 | * | 11/1996 | Osafune et al. | 501/56 |

FOREIGN PATENT DOCUMENTS

| | | |
|---|---|---|
| 6-329440 | 11/1994 | (JP) . |
| 8-111024 | 4/1996 | (JP) . |
| 8-221747 | 8/1996 | (JP) . |
| 10-1327 | 1/1998 | (JP) . |
| 9-77531 | 5/1998 | (JP) . |

* cited by examiner

Primary Examiner—Michael Marcheschi
(74) Attorney, Agent, or Firm—Oblon, Spivak, McClelland, Maier & Neustadt, P.C.

(57) ABSTRACT

Oxynitride glass whose composition is represented by Al—Si—O—N or M—Al—Si—O—N (where M denotes Ca, Mg, or rare earth element), wherein the content of O and N as non-metallic components is in the range of 0 eq %$<N \leq 30$ eq %, with O+N=100 eq %, the content of M, Al, and Si as metallic components is in the range of 20 eq %$\leq Al \leq 30$ eq % and 70 eq %$\leq Si \leq 80$ eq %, respectively, with Al+Si=100 eq % (if M does not exist) and the content of M, Al, and Si as metallic components is within the hatched area in the composition diagrams shown in FIGS. 1 to 3, if M is Ca, Mg, or rare earth metal, or within the hatched area in the composition diagrams shown in FIGS. 4 to 8, if the content of N is in the range of 5 eq %$\leq N \leq 25$ eq %. This glass is superior in specific rigidity and fabricability. It contains nitrogen in a controlled amount so that it has improved specific rigidity without its specific gravity increasing.

18 Claims, 4 Drawing Sheets

GLASS WITH HIGH SPECIFIC RIGIDITY FOR RECORDING MEDIUM

BACKGROUND OF THE INVENTION

1. Field of the Invention

The present invention relates to a glass suitable for use as a disk for recording medium such as magnetic disk.

2. Description of the Related Art

In the field of magnetic disk, technical development is being made rapidly toward increasing the recording density and transfer rate. Nowadays, it is urgent to develop a high-speed disk for rapid transfer. Hence, there is a demand for a disk material with a high specific rigidity which will not vibrate during high-speed running. Conventional aluminum disks have a specific rigidity of 26.7 (Young's modulus [72 GPa] divided by density [2.7 g/cm$^3$]). It is said that aluminum disks need more than twice that specific rigidity if they are to be used at high speeds of 10000 rpm. The only way to double the specific rigidity of aluminum disks is to combine aluminum with ceramics. This is not practical from the standpoint of production cost.

On the other hand, glass disks (2.5-inch in size) are attracting attention because it is easy to increase their specific rigidity. This object is achieved by heating glass at an adequate temperature, thereby causing a crystalline phase with a high Young's modulus to separate out. The resulting glass ceramic has a high Young's modulus. For example, Japanese Patent Laid-open Nos. 329440/1994, 111024/1996, and 221747/1996 disclose a process for causing lithium dioxide crystals and α-quartz crystals to separate out. And Japanese Patent Laid-open No. 77531/1998 discloses a process for causing spinal crystals to separate out, thereby increasing Young's modulus to 109–144 GPa and specific rigidity to 36–47.

The disadvantage of the disclosed technology is that crystallization increases the specific rigidity of glass but it also gives rise to a composite structure (composed of the hard crystalline phase and the soft glass phase). Such a composite structure produces minute steps at the time of polishing, making it difficult to obtain a super-mirror required of disks.

There is a way to increase the specific rigidity of glass per se by incorporation with a rare earth metal which improves Young's modulus of glass. The disadvantage of this technology is that incorporation with a rare earth metal increases not only Young's modulus but also specific gravity, with the result that the specific rigidity of glass does not increase as expected.

One way to increase Young's modulus without remarkably increasing the specific gravity of glass is to replace nitrogen with oxygen in glass, thereby producing oxynitride glass. Japanese Patent Laid-open No. 1327/1998 discloses using oxynitride glass as a disk substrate. It indicates in its example that the glass has an extremely high Young's modulus of 139–185 GPa and a comparatively low specific gravity of 2.9–3.4 g/cm$^3$, with the specific rigidity being as high as 47–55. However, the composition disclosed in its example suggests that the glass contains nitrogen in such a large amount as to form inhomogeneous glass, with the glass partly crystallized. As in the case of glass ceramics mentioned above, such glass gives rise to steps at the time of polishing, making it difficult to obtain a super-mirror. Another disadvantage of glass with microcrystals which have separated out is a slow polishing rate. This leads to a high production cost because time required for fabrication accounts for a large portion of production cost, particularly in the case of mirror-finishing. Glass containing microcrystals increases in fracture toughness to such an extent that abrasive grains do not readily produce minute cracks during polishing. This is the reason why the polishing rate is extremely low in the case of inhomogeneous glass or crystallized glass containing microcrystals.

OBJECT AND SUMMARY OF THE INVENTION

If oxynitride glass is to have an increased Young's modulus with its specific gravity kept low so that it is used as a glass substrate, it is necessary to carefully establish the range of its composition. The present inventors studied this subject and acquired specific knowledge about it. The present invention is based on this knowledge.

BRIEF DESCRIPTION OF THE DRAWINGS

The numbers appearing in FIGS. 1–8 correspond to sample numbers discussed in the examples below.

DETAILED DESCRIPTION OF THE INVENTION

In order to address the above-mentioned problems, the present inventors carried out a series of researches which led to the finding that oxynitride glass can be used as a glass substrate if it has a specific range of composition for homogeneity. According to the present invention, the glass with a high Young's modulus falls under the classes of Al—Si—O—N, Ca—Al—Si—O—N, Mg—Al—Si—O—N, and Re—Al—Si—O—N (where Re stands for one or more members selected from rare earth elements). Each of these glasses has the range of composition as specified in the following.

The oxynitride glass represented by Al—Si—O—N contains Al and Si as metallic components in an amount of 20 eq %≦Al≦30 eq % and 70 eq %≦Si≦80 eq %, with Al+Si=100 eq %, and also contains O and N as non-metallic components in an amount of 0 eq %<N≦30 eq %, with O+N=100 eq %.

Figure 1:
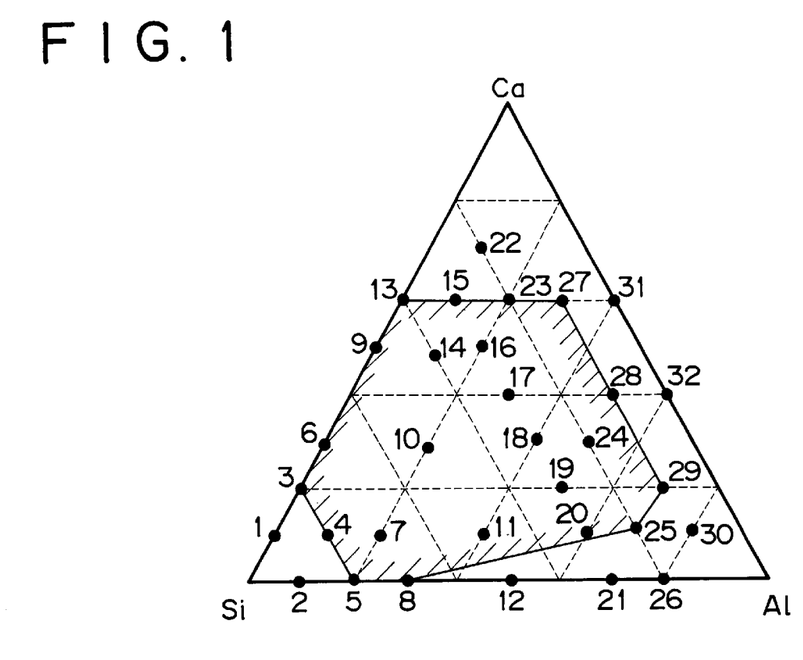
FIG. 1 is a composition diagram of metallic components (Ca, Al, and Si) in the oxynitride glass represented by Ca—Al—Si—O—N in which 0 eq %<N≦30 eq %.

The oxynitride glass represented by Ca—Al—Si—O—N contains Ca, Al, and Si as metallic components in an amount within the hatched area in the composition diagram shown in FIG. 1, and also contains O and N as non-metallic components in an amount of 0 eq %<N≦30 eq %, with O+N=100 eq %, as in the case of the oxynitride glass represented by Al—Si—O—N.

Figure 2:
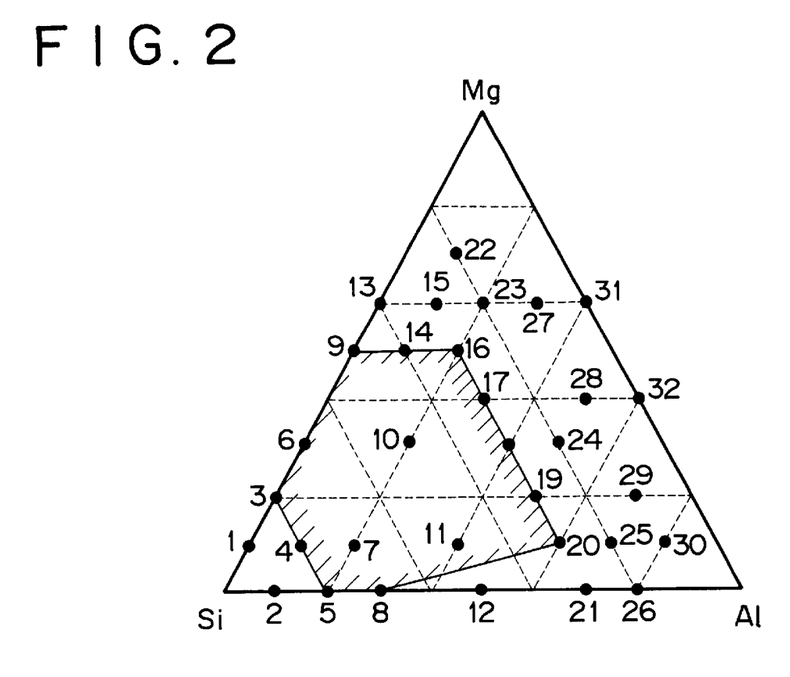
FIG. 2 is a composition diagram of metallic components (Mg, Al, and Si) in the oxynitride glass represented by Mg—Al—Si—O—N in which 0 eq %<N≦30 eq %.

The oxynitride glass represented by Mg—Al—Si—O—N contains Mg, Al, and Si as metallic components in an amount within the hatched area in the composition diagram shown in FIG. 2, and also contains O and N as non-metallic components in an amount of 0 eq %<N≦30 eq %, with O+N=100 eq %, as in the case of the oxynitride glass represented by Al—Si—O—N.

Figure 3:
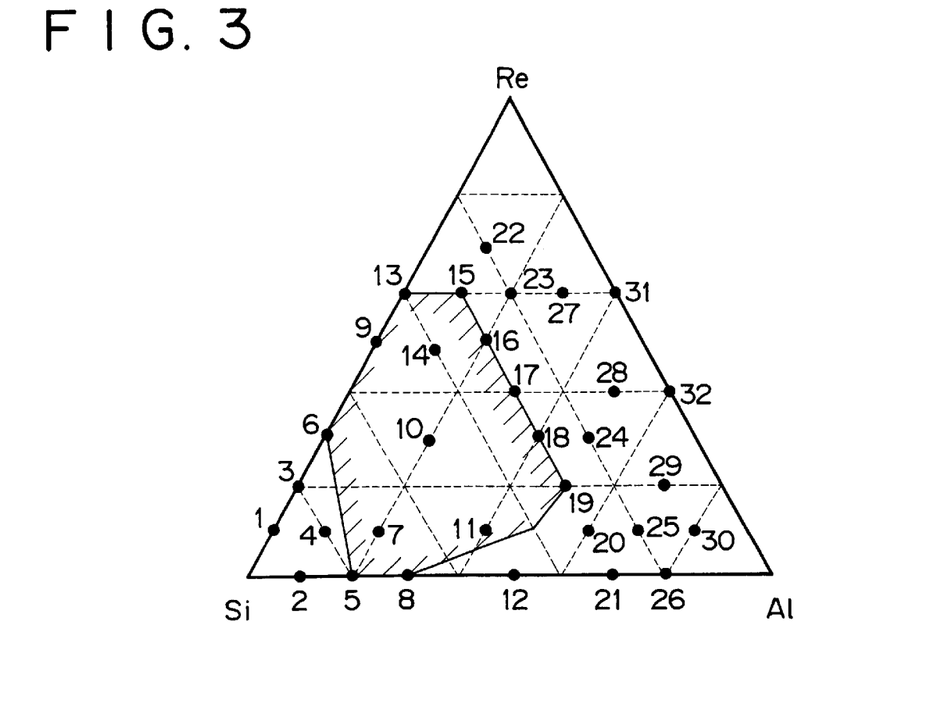
FIG. 3 is a composition diagram of metallic components (Re, Al, and Si) in the oxynitride glass represented by Re—Al—Si—O—N in which 0 eq %<N≦30 eq %.

The oxynitride glass represented by Re—Al—Si—O—N contains Re, Al, and Si as metallic components in an amount within the hatched area in the composition diagram shown in FIG. 3, and also contains O and N as non-metallic components in an amount of 0 eq %<N≦30 eq %, with O+N=100 eq %, as in the case of the oxynitride glass represented by Al—Si—O—N.

Each of the Ca—Al—Si—O—N, Mg—Al—Si—O—N, and Re—Al—Si—O—N glasses should preferably have the range of composition as specified in the following.

Figure 4:
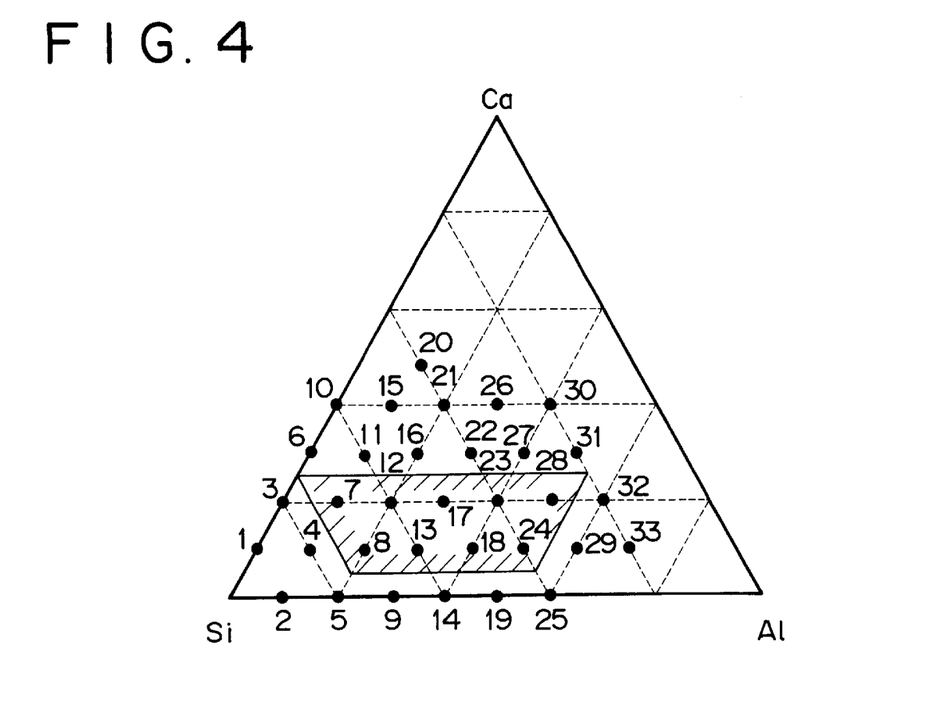
FIG. 4 is a composition diagram of metallic components (Ca, Al, and Si) in the oxynitride glass represented by Ca—Al—Si—O—N in which 5 eq %≦N≦25 eq %.

The oxynitride glass represented by Ca—Al—Si—O—N contains Ca, Al, and Si as metallic components in an amount within the hatched area in the composition diagram shown in FIG. 4, and also contains C and N as non-metallic components in an amount of 5 eq %≦N≦25 eq %, with O+N=100 eq %.

Figure 5:
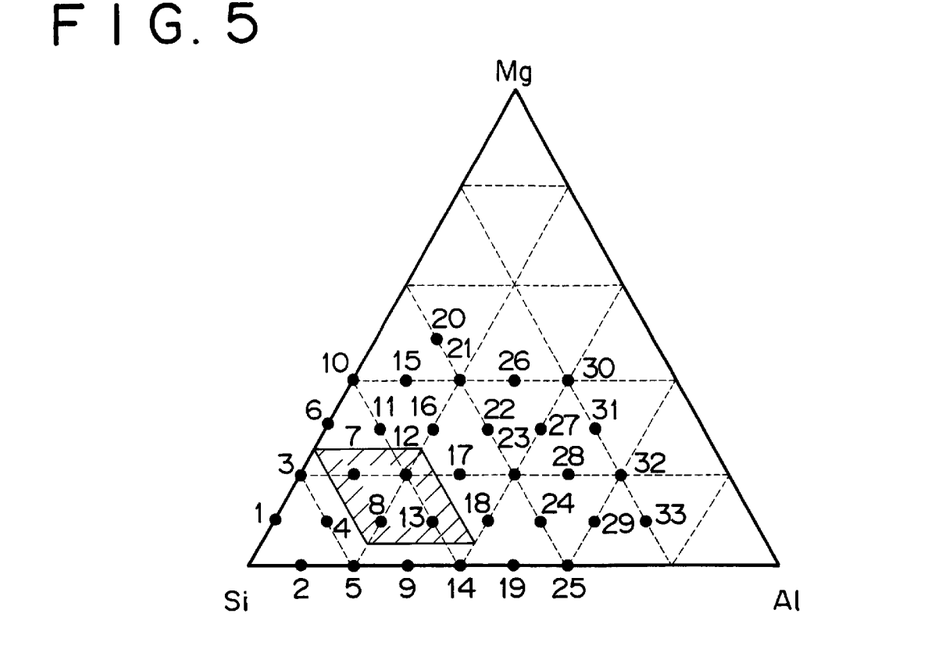
FIG. 5 is a composition diagram of metallic components (Mg, Al, and Si) in the oxynitride glass represented by Mg—Al—Si—O—N in which 5 eq %≦N≦25 eq %.

The oxynitride glass represented by Mg—Al—Si—O—N contains Mg, Al, and Si as metallic components in an amount within the hatched area in the composition diagram shown in FIG. 5, and also contains C and N as non-metallic components in an amount of 5 eq %≦N≦25 eq %, with O+N=100 eq %.

Figure 6:
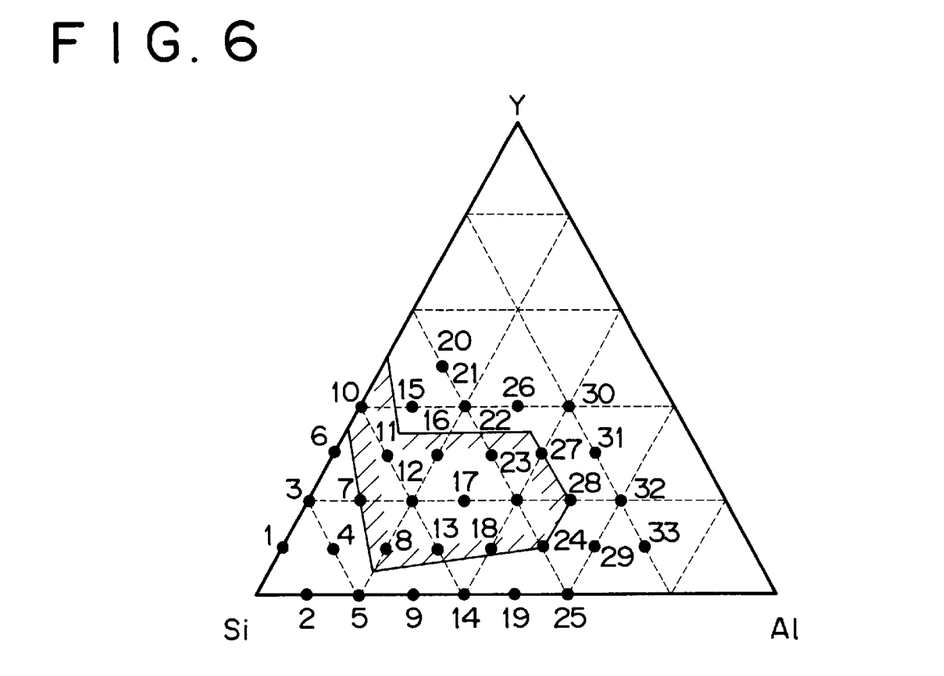
FIG. 6 is a composition diagram of metallic components (Y, Al, and Si) in the oxynitride glass represented by Y—Al—Si—O—N in which 5 eq %≦N≦25 eq %.

The oxynitride glass represented by Y—Al—Si—O—N contains Y, Al, and Si as metallic components in an amount within the hatched area in the composition diagram shown in FIG. 6, and also contains O and N as non-metallic components in an amount of 5 eq %≦N≦25 eq %, with O+N=100 eq %.

Figure 7:
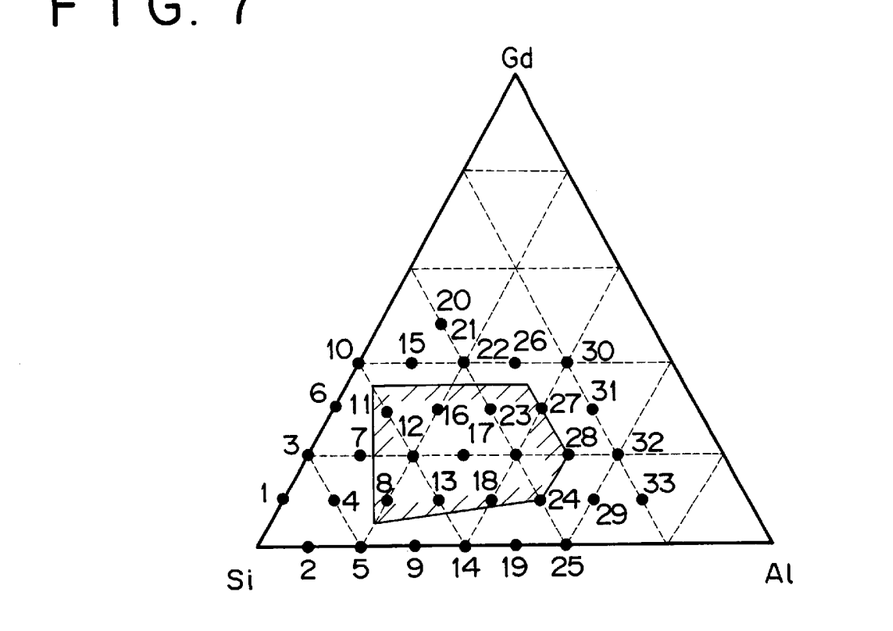
FIG. 7 is a composition diagram of metallic components (Gd, Al, and Si) in the oxynitride glass represented by Cd—Al—Si—O—N in which 5 eq %≦N≦25 eq %.

The oxynitride glass represented by Gd—Al—Si—O—N contains Gd, Al, and Si as metallic components in an amount within the hatched area in the composition diagram shown in FIG. 7, and also contains O and N as non-metallic components in an amount of 5 eq %≦N≦25 eq %, with O+N=100 eq %.

Figure 8:
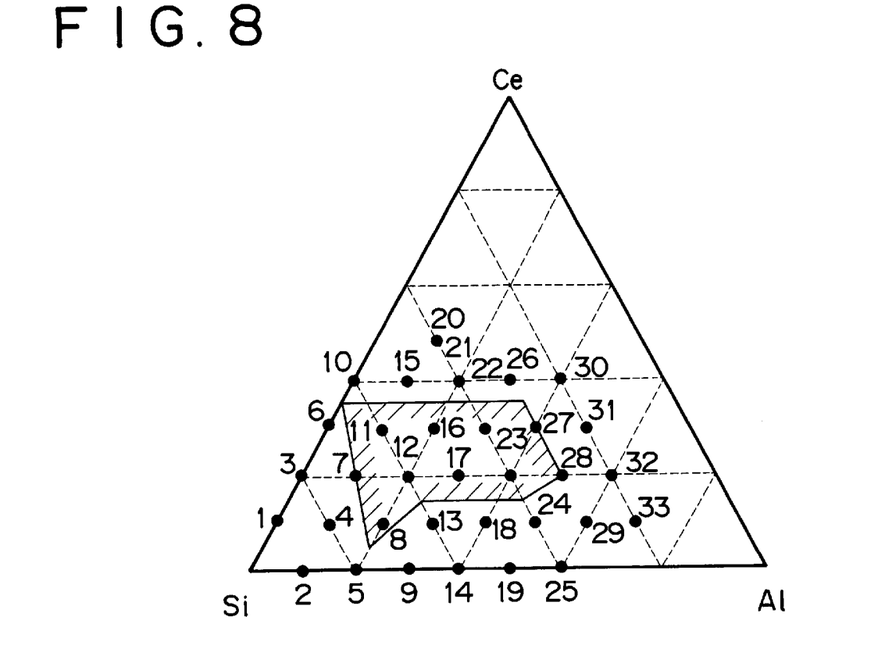
FIG. 8 is a composition diagram of metallic components (Ce, Al, and Si) in the oxynitride glass represented by Ce—Al—Si—O—N in which 5 eq %≦N≦25 eq %.

The oxynitride glass represented by Ce—Al—Si—O—N contains Ce, Al, and Si as metallic components in an amount within the hatched area in the composition diagram shown in FIG. 8, and also contains O and N as non-metallic components in an amount of 5 eq %≦N≦25 eq %, with O+N=100 eq %.

The glasses specified above are superior in specific rigidity and fabricability.

EXAMPLES

According to the present invention, the oxynitride glass contains nitrogen and metal components in an adequate amount (the former affecting Young's modulus and the latter affecting specific gravity) so that it has a high specific rigidity. Moreover, the controlled content yields homogeneous glass which permits stable workability.

According to the present invention, the nitrogen content should be 0 eq %<N≦30 eq %, with O+N=100 eq %. In practice, only a small amount of nitrogen will suffice. An adequate nitrogen content is more than 1 eq %, preferably more than 5 eq %, more preferably more than 10 eq %.

The adequate content of each of Ca, Mg, and Re is shown respectively in FIGS. 1 to 3. The ranges shown in these figures are recommended when the nitrogen content is 15 eq %.

In the case where the nitrogen content is 5 eq %≦N≦25 eq %, it is necessary to restrict the content of Ca, Mg and Re (such as Y, Ge, and Ce) so as to produce a better effect.

Example 1

Samples were prepared each containing Ca, Mg, Y, Ce, La, Nd, or Gd in an amount (eq %) as shown in Table 1. In Table 1, M stands for any one or more of Ca, Mg, Y, Ce, La, Nd, and Gd. For example, E-1 embraces seven samples each containing Ca, Mg, Y, Ce, La, Nd, and Gd alone or in combination with one another in an amount of 10 eq %. Those samples in which M=O, such as E-2, E-5, E-8, E-12, E-21, and E-26, contain none of these metals; in other words, they are oxynitride glass represented by Al—Si—O—N.

These glass samples were prepared by weighing $CaCO_3$, MgO, $Y_2O_3$, $CeO_2$, $La_2O_3$, $Nd_2O_3$, $Gd_2O_3$, $Al_2O_3$, $SiO_2$, and AlN, mixing them in a ball mill, drying, shaping by CIP, melting in a BN crucible at 1750° C., and finally cooling.

TABLE 1

| Sample No. | Si | Al | M | O | N |
|---|---|---|---|---|---|
| E-1 | 90 | 0 | 10 | 85 | 15 |
| E-2 | 90 | 10 | 0 | 85 | 15 |
| E-3 | 80 | 0 | 20 | 85 | 15 |
| E-4 | 80 | 10 | 10 | 85 | 15 |
| E-5 | 80 | 20 | 0 | 85 | 15 |
| E-6 | 70 | 0 | 30 | 85 | 15 |
| E-7 | 70 | 20 | 10 | 85 | 15 |
| E-8 | 70 | 30 | 0 | 85 | 15 |
| E-9 | 50 | 0 | 50 | 85 | 15 |
| E-10 | 50 | 20 | 30 | 85 | 15 |
| E-11 | 50 | 40 | 10 | 85 | 15 |
| E-12 | 50 | 50 | 0 | 85 | 15 |
| E-13 | 40 | 0 | 60 | 85 | 15 |
| E-14 | 40 | 10 | 50 | 85 | 15 |

TABLE 1-continued

| Sample No. | Si | Al | M | O | N |
|---|---|---|---|---|---|
| E-15 | 30 | 10 | 60 | 85 | 15 |
| E-16 | 30 | 20 | 50 | 85 | 15 |
| E-17 | 30 | 30 | 40 | 85 | 15 |
| E-18 | 30 | 40 | 30 | 85 | 15 |
| E-19 | 30 | 50 | 20 | 85 | 15 |
| E-20 | 30 | 60 | 10 | 85 | 15 |
| E-21 | 30 | 70 | 0 | 85 | 15 |
| E-22 | 20 | 10 | 70 | 85 | 15 |
| E-23 | 20 | 20 | 60 | 85 | 15 |
| E-24 | 20 | 50 | 30 | 85 | 15 |
| E-25 | 20 | 70 | 10 | 85 | 15 |
| E-26 | 20 | 80 | 0 | 85 | 15 |
| E-27 | 10 | 30 | 60 | 85 | 15 |
| E-28 | 10 | 50 | 40 | 85 | 15 |
| E-29 | 10 | 70 | 20 | 85 | 15 |
| E-30 | 10 | 80 | 10 | 85 | 15 |
| E-31 | 0 | 40 | 60 | 85 | 15 |
| E-32 | 0 | 60 | 40 | 85 | 15 |

The glass samples with compositions shown in Table 1 were examined for the presence or absence of crystallization and foaming. The results are shown in Table 2. Foaming (indicated by •) means that the glass contains a large number of bubbles because the molten glass has a high viscosity or the molten glass evolves a gas. In the case of large bubbles, the foamed glass may have twice its original volume. Anyway, foamed glass is not suitable for disk because it does not give a smooth surface after polishing. Devitrification (indicated by x) means that the glass becomes opaque due to crystallization.

The results shown in Table 2 are interpreted as follows. E-1, E-2, etc., which have an Si-rich composition, contains not only glass phase but also crystalline phases such as $SiO_2$ phase and $Si_2N_2O$ phase; in other words, they have a comparatively soft glass phase and a hard crystalline phase which are mixed together. This is detrimental to the surface smoothness. In addition, glass with such a composition has a high viscosity and hence is liable to contain a large number of bubbles. Residual bubbles prevent the glass from being finished smooth by polishing.

E-22 etc., which have an M-rich composition, are not suitable for use as glass substrate because they are liable to precipitation of $Ca_2SiO_4+CaSiN_2$ phase or $Mg_2SiO+MgSiN_2$ phase (in the case of Ca- or Mg-containing composition) or they are liable to precipitation of $Y_4Si_2O_7N_2+Y_2SiO_5$, phase (in the case of Y-containing composition).

E-30 etc., which have an Al-rich composition, are liable to precipitation of corundum phase ($Al_2O_3$).

E-12 etc., whose composition is close to the Al—Si line, are liable to precipitation of mullite phase ($Al_2SiO_5$,). M-12 is particularly inadequate because it contains a large number of bubbles.

E-31, E-32, etc., whose composition is close to the Al—Re line, are not suitable for use as glass substrate because they are liable to precipitation of YAG phase ($Y_3Al_{16}O_{12}$) in the case of M=Y or they are liable to precipitation of $Ca_2SiO_4$ and $Mg_2SiO_4$ in the case of M=Ca or Mg.

TABLE 2

| | M = Ca | M = Mg | M = Y | M = Ce | M = La | M = Nd | M = Gd | M = Y + La | M = Y + Gd |
|---|---|---|---|---|---|---|---|---|---|
| E-1 | • | • | • | • | • | • | • | • | • |
| E-2 | • | • | • | • | • | • | • | • | • |
| E-3 | o | o | • | • | • | • | • | • | • |
| E-4 | o | o | • | • | • | • | • | • | • |
| E-5 | o | o | o | o | o | o | o | o | o |
| E-6 | o | o | o | o | o | o | o | o | o |
| E-7 | o | o | o | o | o | o | o | o | o |
| E-8 | o | o | o | o | o | o | o | o | o |
| E-9 | o | o | o | o | o | o | o | o | o |
| E-10 | o | o | o | o | o | o | o | o | o |
| E-11 | o | o | o | o | o | o | o | o | o |
| E-12 | • | • | • | • | • | • | • | • | • |
| E-13 | o | X | o | o | o | o | o | o | o |
| E-14 | o | o | o | o | o | o | o | o | o |
| E-15 | o | X | o | o | o | o | o | o | o |
| E-16 | o | o | o | o | o | o | o | o | o |
| E-17 | o | o | o | o | o | o | o | o | o |
| E-18 | o | o | o | o | o | o | o | o | o |
| E-19 | o | o | o | o | o | o | o | o | o |
| E-20 | o | o | X | X | X | X | X | X | X |
| E-21 | X | o | X | X | X | X | X | X | X |
| E-22 | X | X | X | X | X | X | X | X | X |
| E-23 | o | X | X | X | X | X | X | X | X |
| E-24 | o | X | X | X | X | X | X | X | X |
| E-25 | o | X | X | X | X | X | X | X | X |
| E-26 | X | X | X | X | X | X | X | X | X |
| E-27 | o | X | X | X | X | X | X | X | X |
| E-28 | o | X | X | X | X | X | X | X | X |
| E-29 | o | X | X | X | X | X | X | X | X |
| E-30 | X | X | X | X | X | X | X | X | X |
| E-31 | X | X | X | X | X | X | X | X | X |
| E-32 | X | X | X | X | X | X | X | X | X |

•: foaming, o: homogeneous X: devitrified

Those samples with an N-rich composition are not suitable for use as glass substrate because they are liable to precipitation of silicon nitride (e.g., $Si_3N_4$).

Another six samples were prepared each having a composition of M=20 eq %, Si=60 eq %, and Al=20 eq %, with the nitrogen content varied from 1 to 35%. They were examined for glass formation. The results are shown in Table 3 below.

TABLE 3

| Sample No. | Nitrogen content (eq %) | State of glass | | | | | | |
|---|---|---|---|---|---|---|---|---|
| | | M = Ca | M = Mg | M = Y | M = Ce | M = La | M = Nd | M = Gd |
| E-N-1 | 1 | o | o | o | o | o | o | o |
| E-N-2 | 5 | o | o | o | o | o | o | o |
| E-N-3 | 10 | o | o | o | o | o | o | o |
| E-N-4 | 20 | o | o | o | o | o | o | o |
| E-N-5 | 30 | o | o | o | o | o | o | o |
| E-N-6 | 35 | X | X | X | X | X | X | X | o: homogeneous glass, X: devitrified

The same procedure as above was repeated to prepare glass samples each having a composition of Si=60 eq %, Al=20 eq %, M=20 eq %, O=80 eq %, and N=20 eq %. They were tested for Young's modulus, density, hardness, and surface smoothness after polishing. The results are shown in Table 4 below.

TABLE 4

| | Ca | Mg | Y | Ce | La | Nd | Gd |
|---|---|---|---|---|---|---|---|
| Ra(Å) | 3 | 4 | 3 | 3 | 4 | 3 | 3 |
| Young's modulus (GPa) | 120 | 115 | 141 | 153 | 147 | 145 | 155 |
| Density | 2.87 | 2.78 | 3.53 | 3.69 | 3.69 | 4.10 | 4.25 |
| Hardness | 910 | 780 | 1050 | 1100 | 1030 | 1040 | 1170 |

It is noted that the glass samples containing nitrogen are high in Young's modulus and hence suitable for use for high-speed disk. By contrast, the oxynitride glass incorporated with a rare earth element has a high Young's modulus and also has a high density. Hence, Ca-containing glass or Mg-containing glass is preferable from the standpoint of improvement in specific rigidity. These samples are homogeneous (without crystalline phase) and hence have a small surface roughness (Ra=3–4 Å) after polishing.

Glass samples containing Ca, Mg, and rare earth element (Y, Gd, or Ce), with nitrogen content being in the range of 5 eq %≦N≦25 eq %, were studied. The composition of each sample is shown in Table 5. Each sample contains Si, Al, M', and 10 or 20 eq % nitrogen, where M' stands for any of Ca, Mg, Y, Gd, and Ce. Therefore, F-1 embraces five samples each containing Ca, Mg, Y, Gd, and Ce, alone or in combination with one another in an amount of 10 eq %. "M'=0" means that the sample is oxynitride glass containing none of these metals.

These glass samples were prepared by weighing $CaCo_3$, $MgCO_3$, $Y_2O_3$, $CeO_2$, $Gd_2O_3$, $Al_2O_3$, $SiO_2$ and $Si_3O_4$, mixing them in a ball mill, drying, shaping by CIP, melting in a BN crucible at 1750° C., and finally cooling.

TABLE 5

| Sample No. | Si | Al | M' |
|---|---|---|---|
| F-1 | 90 | 0 | 10 |
| F-2 | 90 | 10 | 0 |
| F-3 | 80 | 0 | 20 |

TABLE 5-continued

| Sample No. | Si | Al | M' |
|---|---|---|---|
| F-4 | 80 | 10 | 10 |
| F-5 | 80 | 20 | 0 |
| F-6 | 70 | 0 | 30 |
| F-7 | 70 | 10 | 20 |
| F-8 | 70 | 20 | 10 |
| F-9 | 70 | 30 | 0 |
| F-10 | 60 | 0 | 40 |
| F-11 | 60 | 10 | 30 |
| F-12 | 60 | 20 | 20 |
| F-13 | 60 | 30 | 10 |
| F-14 | 60 | 40 | 0 |
| F-15 | 50 | 10 | 40 |
| F-16 | 50 | 20 | 30 |
| F-17 | 50 | 30 | 20 |
| F-18 | 50 | 40 | 10 |
| F-19 | 50 | 50 | 0 |
| F-20 | 40 | 10 | 50 |
| F-21 | 40 | 20 | 40 |
| F-22 | 40 | 30 | 30 |
| F-23 | 40 | 40 | 20 |
| F-24 | 40 | 50 | 10 |
| F-25 | 40 | 60 | 0 |
| F-26 | 30 | 30 | 40 |
| F-27 | 30 | 40 | 30 |
| F-28 | 30 | 50 | 20 |
| F-29 | 30 | 60 | 10 |
| F-30 | 20 | 40 | 40 |
| F-31 | 20 | 50 | 30 |
| F-32 | 20 | 60 | 20 |
| F-33 | 20 | 70 | 10 |

The glass samples of the composition shown in Table 5 were examined for the presence or absence of crystallization and foaming, and some of them were also tested for surface roughness (Ra). They include F-5, F-12, F-14, F-15, F-19, and F-29, which contain 10 eq % nitrogen, and F-2, F-5, F-8, F-12, F-14, F-15, and F-23, which contain 20 eq % nitrogen. Table 6 shows the results of tests on the samples containing 10 eq % nitrogen, and Table 7 shows the results of tests on the samples containing 20 eq % nitrogen. The samples were rated according to the following criteria.

Good: homogeneous
Poor: less than 50% crystalline (C) or foamed (F)
Bad: more than 50% crystalline (C) or foamed (F)

TABLE 6

(N = 10 eq %)

| Sample No. | M' = Ca | M' = Mg | M' = Y | M' = Gd | M' = Ce |
|---|---|---|---|---|---|
| F-1 | Bad (F) | Bad (F) | Bad (F) | Bad (F) | Bad (F) |
| F-2 | Bad (F) | Bad (F) | Bad (F) | Bad (F) | Bad (F) |
| F-3 | Poor (F) | Poor (F) | Bad (F) | Bad (F) | Bad (F) |
| F-4 | Poor (F) | Poor (F) | Bad (F) | Bad (F) | Bad (F) |
| F-5 | Poor (F) | Poor (F) | Poor (F) | Poor (F) | Poor (F) |
|  | Ra:17 Å | Ra:16 Å | Ra:17 Å | Ra:15 Å | Ra:15 Å |
| F-6 | Poor (C) | Poor (C) | Poor (C) | Poor (C) | Poor (C) |
| F-7 | Good | Good | Good | Poor (C) | Poor (C) |
| F-8 | Good | Good | Good | Good | Good |
| F-9 | Poor (F) | Poor (F) | Poor (F) | Poor (F) | Poor (F) |
| F-10 | Poor (C) | Poor (C) | Good | Poor (C) | Poor (C) |
| F-11 | Poor (C) | Poor (C) | Good | Good | Good |
| F-12 | Good | Good | Good | Good | Good |
|  | Ra:4 Å | Ra:5 Å | Ra:3 Å | Ra:4 Å | Ra:3 Å |
| F-13 | Good | Good | Good | Good | Poor (F) |
| F-14 | Bad (F) | Bad (F) | Bad (F) | Bad (F) | Bad (F) |
|  | Ra:* | Ra:* | Ra:* | Ra:* | Ra:* |
| F-15 | Poor (C) | Poor (C) | Poor (C) | Poor (C) | Poor (C) |
|  | Ra:10 Å | Ra:15 Å | Ra:13 Å | Ra:13 Å | Ra:15 Å |
| F-16 | Poor (C) | Poor (C) | Good | Good | Good |
| F-17 | Good | Poor (C) | Good | Good | Good |
| F-18 | Good | Poor (C) | Good | Good | Poor (F) |
| F-19 | Bad (C) | Bad (C) | Bad (C) | Bad (C) | Bad (C) |
|  | Ra:36 Å | Ra:49 Å | Ra:31 Å | Ra:34 Å |  |
| F-20 | Poor (C) | Poor (C) | Poor (C) | Poor (C) | Poor (C) |
| F-21 | Poor (C) | Poor (C) | Poor (C) | Poor (C) | Poor (C) |
| F-22 | Poor (C) | Poor (C) | Good | Good | Good |
| F-23 | Good | Poor (C) | Good | Good | Good |
| F-24 | Good | Poor (C) | Good | Good | Poor (F) |
| F-25 | Bad (C) | Bad (C) | Bad (C) | Bad (C) | Bad (C) |
| F-26 | Poor (C) | Poor (C) | Poor (C) | Poor (C) | Poor (C) |
| F-27 | Poor (C) | Poor (C) | Good | Good | Good |
| F-28 | Good | Poor (C) | Good | Good | Good |
| F-29 | Poor (C) | Poor (C) | Bad (C) | Bad (C) | Bad (C) |
|  |  |  |  |  | Ra: 52 Å |
| F-30 | Poor (C) | Bad (C) | Bad (C) | Bad (C) | Bad (C) |
| F-31 | Poor (C) | Bad (C) | Bad (C) | Bad (C) | Bad (C) |
| F-32 | Poor (C) | Bad (C) | Bad (C) | Bad (C) | Bad (C) |
| F-33 | Poor (C) | Bad (C) | Bad (C) | Bad (C) | Bad (C) |

*unmeasurable

TABLE 7

(N = 20 eq %)

| Sample No. | M' = Ca | M' = Mg | M' = Y | M' = Gd | M' = Ce |
|---|---|---|---|---|---|
| F-1 | Bad (F) | Bad (F) | Bad (F) | Bad (F) | Bad (F) |
| F-2 | Bad (F) | Bad (F) | Bad (F) | Bad (F) | Bad (F) |
|  | Ra:* | Ra:* | Ra:* | Ra:* | Ra:* |
| F-3 | Poor (F) | Poor (F) | Bad (F) | Bad (F) | Bad (F) |
| F-4 | Poor (F) | Poor (F) | Bad (F) | Bad (F) | Bad (F) |
| F-5 | Poor (F) | Poor (F) | Poor (F) | Poor (F) | Poor (F) |
|  | Ra:15 Å | Ra:13 Å | Ra:15 Å | Ra:16 Å | Ra:14 Å |
| F-6 | Poor (C) | Poor (C) | Poor (C) | Poor (C) | Poor (C) |
| F-7 | Good | Good | Good | Poor (C) | Poor (C) |
| F-8 | Good | Good | Good | Good | Good |
|  |  | Ra:6 Å |  |  |  |
| F-9 | Poor (C) | Poor (C) | Poor (C) | Poor (C) | Poor (C) |
| F-10 | Poor (C) | Poor (C) | Good | Poor (C) | Poor (C) |
| F-11 | Poor (C) | Poor (C) | Good | Good | Good |
| F-12 | Good | Good | Good | Good | Good |
|  | Ra:3 Å |  | Ra:54 Å |  | Ra:5 Å |
| F-13 | Good | Good | Good | Good | Poor (F) |
| F-14 | Bad (C) | Bad (C) | Bad (C) | Bad (C) | Bad (C) |
|  | Ra:52 Å | Ra:44 Å | Ra:50 Å | Ra:39 Å | Ra:45 Å |
| F-15 | Poor (C) | Poor (C) | Poor (C) | Poor (C) | Poor (C) |
|  | Ra:12 Å | Ra:10 Å | Ra:13 Å | Ra:12 Å | Ra:11 Å |

TABLE 7-continued (N = 20 eq %)

| Sample No. | M' = Ca | M' = Mg | M' = Y | M' = Gd | M' = Ce |
|---|---|---|---|---|---|
| F-16 | Poor (C) | Poor (C) | Good | Good | Good |
| F-17 | Good | Poor (C) | Good | Good | Good |
| F-18 | Good | Poor (C) | Good | Good | Poor F |
| F-19 | Bad (C) | Bad (C) | Bad C | Bad (C) | Bad (C) |
| F-20 | Poor (C) | Poor (C) | Poor (C) | Poor (C) | Poor (C) |
| F-21 | Poor (C) | Poor (C) | Poor (C) | Poor (C) | Poor (C) |
| F-22 | Poor (C) | Poor (C) | Good | Good | Good |
| F-23 | Good | Poor (C) | Good | Good | Good |
|  |  |  |  | Ra:4 Å |  |
| F-24 | Good | Poor (C) | Good | Good | Poor (F) |
| F-25 | Bad (C) | Bad (C) | Bad (C) | Bad (C) | Bad (C) |
| F-26 | Poor (C) | Poor (C) | Poor (C) | Poor (C) | Poor (C) |
| F-27 | Poor (C) | Poor (C) | Good | Good | Good |
| F-28 | Good | Poor (C) | Good | Good | Good |
| F-29 | Poor (C) | Poor (C) | Bad (C) | Bad (C) | Bad (C) |
| F-30 | Poor (C) | Bad (C) | Bad (C) | Bad (C) | Bad (C) |
| F-31 | Poor (C) | Bad (C) | Bad (C) | Bad (C) | Bad (C) |
| F-32 | Poor (C) | Bad (C) | Bad (C) | Bad (C) | Bad (C) |
| F-33 | Poor (C) | Bad (C) | Bad (C) | Bad (C) | Bad (C) |

*unmeasurable

Samples were prepared each containing nitrogen 5 eq %, 25 eq %, or 30 eq %. They were examined for glass state. The results are shown in Table 8 below.

TABLE 8

|  |  | Si | Al | M' | O | N | Rating |
|---|---|---|---|---|---|---|---|
| M' = Ca | F-34 | 70 | 20 | 10 | 95 | 5 | Good |
|  | F-35 | 40 | 40 | 20 | 95 | 5 | Good |
|  | F-36 | 70 | 10 | 20 | 75 | 25 | Good |
|  | F-37 | 30 | 50 | 20 | 75 | 25 | Good |
|  | F-38 | 70 | 10 | 20 | 70 | 30 | Poor (C) |
|  | F-39 | 30 | 50 | 20 | 70 | 30 | Poor (C) |
| M' = Mg | F-34 | 70 | 10 | 20 | 95 | 5 | Good |
|  | F-35 | 60 | 30 | 10 | 95 | 5 | Good |
|  | F-36 | 70 | 10 | 20 | 75 | 25 | Good |
|  | F-37 | 70 | 20 | 10 | 75 | 25 | Good |
|  | F-38 | 70 | 10 | 20 | 70 | 30 | Poor(C) |
|  | F-39 | 70 | 20 | 10 | 70 | 30 | Poor (C) |
| M' = Y | F-34 | 60 | 10 | 30 | 95 | 5 | Good |
|  | F-35 | 30 | 50 | 20 | 95 | 5 | Good |
|  | F-36 | 60 | 0 | 40 | 75 | 25 | Good |
|  | F-37 | 30 | 50 | 20 | 75 | 25 | Good |
|  | F-38 | 60 | 0 | 40 | 70 | 30 | Poor (C) |
|  | F-39 | 30 | 50 | 20 | 70 | 30 | Poor (C) |
| M' = Gd | F-34 | 60 | 10 | 30 | 95 | 5 | Good |
|  | F-35 | 30 | 50 | 20 | 95 | 5 | Good |
|  | F-36 | 50 | 30 | 20 | 75 | 25 | Good |
|  | F-37 | 30 | 50 | 20 | 75 | 25 | Good |
|  | F-38 | 50 | 30 | 20 | 70 | 30 | Poor (C) |
|  | F-39 | 30 | 50 | 20 | 70 | 30 | Poor(C) |
| M' = Ce | F-34 | 70 | 20 | 10 | 95 | 5 | Good |
|  | F-35 | 30 | 50 | 20 | 95 | 5 | Good |
|  | F-36 | 60 | 10 | 30 | 75 | 25 | Good |
|  | F-37 | 40 | 40 | 20 | 75 | 25 | Good |
|  | F-38 | 60 | 10 | 30 | 70 | 30 | Poor (C) |
|  | F-39 | 40 | 40 | 20 | 70 | 30 | Poor (C) |

It is noted from Table 8 that samples F-34 to F-37, which contain 5 eq % or 25 eq % nitrogen, are homogeneous glass regardless of the kind of metallic elements they contain. By contrast, samples F-38 and F-39, which contain less than 30 eq % nitrogen, are inhomogeneous glass containing less than 50% crystals.

A base plate measuring 95 mm in diameter and 1.2 mm thick was prepared from glass having a composition of (Si, Al, Ma', O, N)=(50, 30, 20, 75, 25). This base plate was chamfered by using an edge grinder. The base plate, fixed to a carrier, underwent primary lapping by a double-sided lapping machine "18B" equipped with a cast iron lap containing 20 wt % alumina (20 μm in average particle diameter), at a rotary speed of 40 rpm under a finishing pressure of 100 gf/cm². Then, the base plate underwent secondary lapping by a cast iron lap containing 20 wt % alumina (8 μm in average particle diameter) under the same conditions as in primary lapping. After washing, the base plate underwent primary polishing by a double-sided lapping machine (the same one as used as above) equipped with a lap covered with a rigid foamed polyurethane pad, while supplying a polishing liquid containing 20 wt % cerium oxide (2 μm in average particle diameter), at a rotary speed of 30 rpm under a finishing pressure of 250 gf/cm². After simple washing, the base plate underwent secondary polishing by a lap covered with a rigid polyurethane pad having a nap layer while supplying a polishing liquid containing 20 wt % cerium oxide (1 μm average particle diameter), at a rotary speed of 25 rpm under a finishing pressure of 200 gf/cm². Thus there was obtained a finished disk 0.8 mm in thickness. This disk was examined for surface roughness by using a contact-type surface roughness meter. The results are shown in Table 9.

TABLE 9

|  | M' = Ca | M' = Mg | M' = Y | M' = Gd | M' = Ce |
|---|---|---|---|---|---|
| F-34 | 5 | 5 | 4 | 5 | 3 |
| F-35 | 3 | 4 | 4 | 3 | 5 |
| F-36 | 5 | 3 | 5 | 4 | 4 |
| F-37 | 5 | 4 | 5 | 4 | 3 |
| F-38 | 14 | 44 | 32 | 14 | 34 |
| F-39 | 35 | 53 | 43 | 40 | 54 |

Unit: Å

It is noted from Table 9 that those disks made of any of glass samples F-34 to F-37, each containing 5 eq % or 25 eq % nitrogen, have a good surface with a surface roughness of 3–5 Å. By contrast, those disks made of any of glass samples F-38 and F-39, each containing 30 eq % nitrogen, have a surface roughness greater than 14 Å regardless of the kind of metal they contain, and hence they are not suitable for practical use.

A base sheet was made from glass having the composition of F-37, and it was fabricated into a disk in the same manner as above. The disk was examined for surface roughness (Ra), Young's modulus, density, and hardness. The results are shown in Table 10.

TABLE 10

|  | M' = Ca | M' = Mg | M' = Y | M' = Gd | M' = Ce |
|---|---|---|---|---|---|
| Ra (Å) | 4 | 4 | 3 | 4 | 3 |
| Young's modulus (GPa) | 130 | 119 | 145 | 157 | 160 |
| Density | 2.98 | 2.60 | 3.39 | 3.88 | 3.89 |
| Hardness | 925 | 790 | 1,062 | 1,120 | 1,200 |

It is noted from Table 10 that those disks containing 25 eq % nitrogen have a good surface roughness and a high value of Young's modulus and hence they are suitable for use as high-speed disk. Oxynitride glass containing Y, Gd, or Ce (rare earth element) have a high value of Young's modulus but they also have a high density; therefore, oxynitride glass containing Ca or Mg is desirable from the standpoint of improvement in specific rigidity.

[Effect of the invention] As mentioned above, the present invention provides a special kind of glass with high specific rigidity for a disk for recording medium. This glass is oxynitride glass containing a special component within a specific range, and hence it can be made into a homogeneous base plate with a high Young's modulus which can be fabricated into the disk for high-density recording, high-speed transfer, and high-speed rotation.

What is claimed is:

1. A recording medium comprising an oxynitride glass whose composition is represented by Al—Si—O—N, wherein the content of Al and Si as metallic components is in the range of 20 eq %≦Al≦30 eq % and 70 eq %≦Si≦80 eq %, respectively, with Al+Si=100 eq %, and the content of O and N as non-metallic components is in the range of 0 eq %<N≦30 eq %, with O+N=100 eq %.

2. A recording medium comprising an oxynitride glass whose composition is represented by Ca—Al—Si—O—N, wherein the content of Ca, Al, and Si as metallic components is within the hatched area in the composition diagram shown in FIG. 1, and the content of O and N as non-metallic components is in the range of 0 eq %<N≦30 eq %, with O+N=100 eq %.

3. A recording medium comprising an oxynitride glass whose composition is represented by Mg—Al—Si—O—N, wherein the content of Mg, Al, and Si as metallic components is within the hatched area in the composition diagram shown in FIG. 2, and the content of O and N as non-metallic components is in the range of 0 eq %<N≦30 eq %, with O+N=100 eq %.

4. A recording medium comprising an oxynitride glass whose composition is represented by Re—Al—Si—O—N (where Re denotes one or more members selected from rare earth elements), wherein the content of Re, Al, and Si as metallic components is within the hatched area in the composition diagram shown in FIG. 3, and the content of O and N as non-metallic components is in the range of 0 eq %<N≦30 eq %, with O+N=100 eq %.

5. A recording medium comprising an oxynitride glass whose composition is represented by Ca—Al—Si—O—N, wherein the content of Ca, Al, and Si as metallic components is within the hatched area in the composition diagram shown in FIG. 4, and the content of O and N as non-metallic components is in the range of 5 eq %≦N≦25 eq %, with O+N=100 eq %.

6. A recording medium comprising an oxynitride glass whose composition is represented by Mg—Al—Si—O—N, wherein the content of Mg, Al and Si as metallic components is within the hatched area in the composition diagram shown in FIG. 5, and the content of O and N as non-metallic components is in the range of 5 eq %≦N≦25 eq %, with O+N=100 eq %.

7. A recording medium comprising an oxynitride glass whose composition is represented by Y—Al—Si—O—N, wherein the content of Y, Al, and Si as metallic components is within the hatched area in the composition diagram shown in FIG. 6, and the content of O and N as non-metallic components is in the range of 5 eq %≦N≦25 eq %, with O+N=100 eq %.

8. A recording medium comprising an oxynitride glass whose composition is represented by Gd—Al—Si—O—N, wherein the content of Gd, Al, and Si as metallic components is within the hatched area in the composition diagram shown in FIG. 7, and the content of O and N as non-metallic components is in the range of 5 eq $\% \leqq N \leqq 25$ eq %, with O+N=100 eq %.

9. A recording medium comprising an oxynitride glass whose composition is represented by Ce—Al—Si—O—N, wherein the content of Ce, Al, and Si as metallic components is within the hatched area in the composition diagram shown in FIG. 8, and the content of O and N as non-metallic components is in the range of 5 eq $\% \leqq N \leqq 25$ eq %, with O+N=100 eq %.

10. A method of making a recording medium, the method comprising melting a glass composition; and forming the recording medium of claim 1.

11. A method of making a recording medium, the method comprising melting a glass composition; and forming the recording medium of claim 2.

12. A method of making a recording medium, the method comprising melting a glass composition; and forming the recording medium of claim 3.

13. A method of making a recording medium, the method comprising melting a glass composition; and forming the recording medium of claim 4.

14. A method of making a recording medium, the method comprising melting a glass composition; and forming the recording medium of claim 5.

15. A method of making a recording medium, the method comprising melting a glass composition; and forming the recording medium of claim 6.

16. A method of making a recording medium, the method comprising melting a glass composition; and forming the recording medium of claim 7.

17. A method of making a recording medium, the method comprising melting a glass composition; and forming the recording medium of claim 8.

18. A method of making a recording medium, the method comprising melting a glass composition; and forming the recording medium of claim 9.

* * * * *